E. R. McKINZIE.
AUTOMATIC LUBRICATOR.
APPLICATION FILED DEC. 8, 1913.
1,112,821.
Patented Oct. 6, 1914.
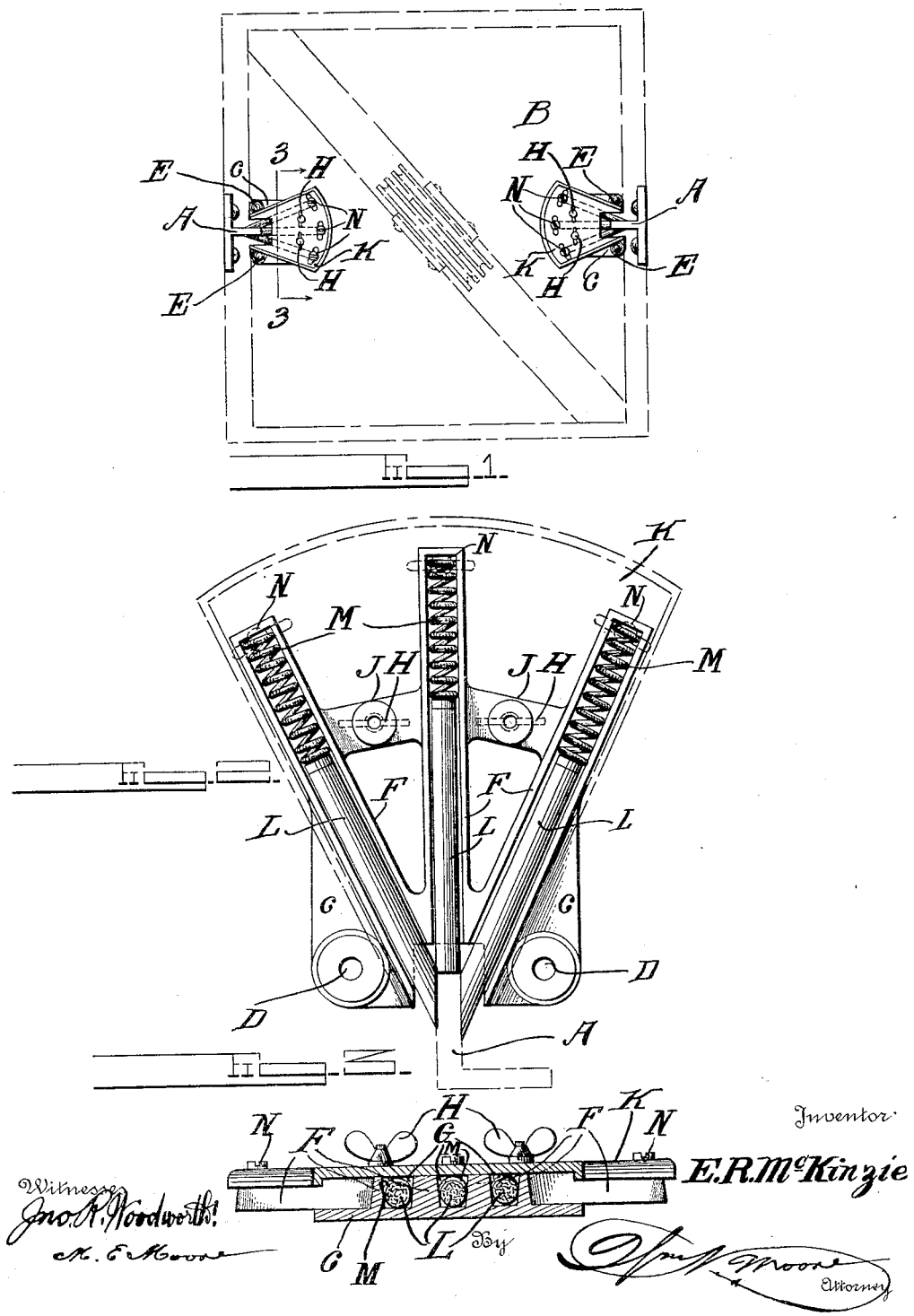
Inventor
E. R. McKinzie

UNITED STATES PATENT OFFICE.

EDWARD ROSELL McKINZIE, OF MEMPHIS, TENNESSEE.

AUTOMATIC LUBRICATOR.

1,112,821. Specification of Letters Patent. Patented Oct. 6, 1914.

Application filed December 8, 1913. Serial No. 805,279.

*To all whom it may concern:*

Be it known that I, EDWARD R. McKINZIE, a citizen of the United States, residing at Memphis, in the county of Shelby and State of Tennessee, have invented certain new and useful Improvements in Automatic Lubricators, of which the following is a specification.

My invention relates to improvements in automatic lubricators and refers particularly to a lubricator for use upon elevators for applying the lubricant to the guides upon which the elevator travels.

One object of my invention is the provision of a lubricator which will utilize lubricant in hard or stick form and which will automatically cause the lubricant to be applied in a smooth and even manner to the edge and side of the elevator guides, and thus insure a perfect lubrication of the guides.

Another object of my invention is the provision of an automatic lubricator which can be readily applied to elevators in general use at a very small cost, which will permit of the easy application or removal of the lubricant, which will cause the lubricant to bear in proper manner upon the guides to prevent wasting of the lubricant, and which from every point of view will be thoroughly efficient and practical.

With these objects in view, my invention consists of an automatic lubricator of the character and for the purpose stated embodying novel features of construction and combination of parts substantially as disclosed herein.

Figure 1 represents a plan view of the lubricator and elevator guides, with the elevator shown in dotted lines to illustrate the application of my invention. Fig. 2 represents a top plan view of one of the lubricators, shown on an enlarged scale with the cover plate removed, and Fig. 3 represents a sectional view on the line 3—3 of Fig. 1.

My invention is particularly designed for lubricating the vertical guide strips A, upon which the elevator B, shown in dotted lines, travels, and the device consists of the base plate C, provided with openings D, to receive securing means E, the plate being of tapering or angular form and provided with a series of raised portions F, which form three channels or cavities G, and upon this plate, by means of the set screws H, which engage the connecting ribs J of the base plate, is retained the cover plate K. From this construction it will be observed that the base plate is secured to the elevator with the series of three cavities thereof, being disposed adjacent to the inner edge and sides of the guides A, and in said series of cavities are placed the three sticks L of lubricant, the exposed ends of said sticks bearing against the three faces of the guide strip and being retained against said faces by means of the coil springs M, which have one end bearing against said lubricant sticks and their other end resting against the closed wall of the raised portions of the base plate. These springs exert their tension or pressure to cause the lubricant at all times to bear upon the faces of the guide strips and to retain the springs in place. I provide the series of screws N which pass through the cover and engage said springs.

The operation of my invention will be readily understood from the description and drawings, and it is evident that I provide a lubricator which is automatic in operation, which applies the lubricant uniformly and evenly to the three faces of the guides, which permits of the ready insertion or removal of the lubricant, which can be applied with ease and cheapness, and which from every point of view will prove thoroughly efficient and practical.

I claim:

1. In an automatic lubricator, the combination with the elevator and the vertical guides therefor, of the base plates formed with a series of converging cavities leading to the faces of said guides, lubricating sticks mounted in said cavities, and springs arranged in said cavities and engaging said sticks for forcing them into contact with the faces of the guides.

2. In an automatic lubricator, the combination with the elevator and the vertical guides therefor, of the base plate formed with a series of converging cavities leading to the faces of said guides, lubricating sticks mounted in said cavities, springs arranged in said cavities and engaging said sticks for forcing them into contact with the faces of the guides, a cover secured to said base plate for protecting the springs and lubricant and retaining the same in place, and screws for retaining the springs.

In testimony whereof I affix my signature in presence of two witnesses.

EDWARD ROSELL McKINZIE.

Witnesses:
   HENRY BURKHARD,
   ALBERT B. GOODWIN.

---

Copies of this patent may be obtained for five cents each, by addressing the "Commissioner of Patents, Washington, D. C."